United States Patent
Kondo

[15] 3,638,543
[45] Feb. 1, 1972

[54] AUTOMATIC EXPOSURE SYSTEM FOR PHOTOGRAPHIC CAMERA

[72] Inventor: Isao Kondo, Tokyo, Japan
[73] Assignee: Olympus Optical Co. Ltd., Tokyo, Japan
[22] Filed: July 17, 1970
[21] Appl. No.: 55,839

[30] Foreign Application Priority Data

| Aug. 25, 1969 | Japan | 44/67068 |
| Aug. 25, 1969 | Japan | 44/67069 |
| Oct. 27, 1969 | Japan | 44/86183 |
| Oct. 28, 1969 | Japan | 44/102847 |
| Oct. 3, 1969 | Japan | 44/87785 |
| Nov. 6, 1969 | Japan | 44/89580 |
| Nov. 20, 1969 | Japan | 44/93434 |

[52] U.S. Cl. ................ 95/10 CE, 95/11.5 R, 95/64 A, 315/241 P
[51] Int. Cl. ........................................... G03b 9/70
[58] Field of Search ............... 95/10 C, 11.5 R; 315/241 P

[56] References Cited

UNITED STATES PATENTS 3,521,540   7/1970   Careallo ......................... 95/11.5
3,424,071   1/1969   Schwahn ......................... 95/11.5

Primary Examiner—Samuel S. Matthews
Assistant Examiner—Michael L. Gellner
Attorney—Kelman and Berman

[57] ABSTRACT

An automatic exposure system for use with a camera of the type which includes a light-sensing device and a diaphragm-adjusting mechanism actuated thereby. The exposure system includes a first variable resistor serially connected to the diaphragm-adjusting mechanism but mechanically altered as the focus of the camera is altered. The flash unit with which the camera operates includes a second variable resistor which is adjusted according to the guide number of the flash unit. When the flash unit is coupled to the camera, the first and second variable resistors are placed in series, via the same leads that connect to the synchronization contacts on the camera shutter, with the automatic diaphragm. In this manner, the correct exposure is ensured, since the division of the camera-to-object distance into the guide number is done automatically by the current-limiting effects of the first and second resistors.

11 Claims, 11 Drawing Figures

3,638,543

INVENTOR,
Isao Kondo
BY: Kelman and Berman
AGENTS 3,638,543

AUTOMATIC EXPOSURE SYSTEM FOR PHOTOGRAPHIC CAMERA

BACKGROUND OF THE INVENTION

The present invention relates to a device for controlling the exposure of a camera by means of an electronic flash device to achieve the proper exposure.

Heretofore, flash light photography using a stroboscopic flash device has been very troublesome, because it requires a time-consuming calculation based on the guide number of the flash device. In other words, the diaphragm opening of the camera must be set to a value which is the quotient obtained by dividing the guide number of the flash device by the distance between the object and the camera. However, errors in estimating the distance by the operator are fairly greater resulting in an incorrect setting of the diaphragm opening while the actual graduations of the diaphragm opening given in the camera tends to differ from the value of the diaphragm opening obtained by the calculation based on the guide number and the distance estimated by the operator thereby resulting in an incorrect setting of the diaphragm opening.

Therefore, experience and skill have been required for the operator in order to obtain high quality photographs using a stroboscopic flash device.

Recently, a so-called "autostrobo" flash device has been developed which is coupled with the camera. The flash device is set for the sensitivity of the film and the diaphragm opening and illumination is automatically stopped when the light received by the device reaches the amount required for the proper exposure. However, since the duration of the stroboscopic flash is of the order of one one-thousandth of a second, the required high accuracy of the flash device makes the flash device very expensive.

Other known flash devices require three lead wires to connect the flash device to the camera and very complicated connecting means, whereby incorrect contact of the connecting means and breakage of the lead wires are liable to occur.

It is an object of the present invention to provide a stroboscopic electronic flash device equipped to achieve the proper exposure, in which the above-described disadvantages of the prior art are avoided.

Another object of the present invention is to provide only a pair of lead wires for connecting the camera to the flash device.

A further object of the present invention is to provide a device for indicating complete charging of the main capacitor which is visible through the finder of the camera.

FIG. 1 diagrammatically illustrates the electrical connection of a known flash device to a camera for automatic control of exposure;

DETAILED DESCRIPTION OF THE PREFERRED EMBODIMENTS

Figure 1:
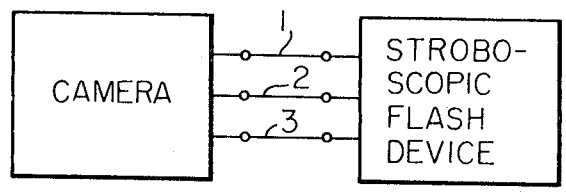

Referring to FIG. 1 the illustrated prior art device for controlling the exposure of a camera coupled with a stroboscopic electronic flash device requires three connecting lead wires 1, 2 and 3 as previously described. The control signal for proper exposure is supplied from the camera to the flash device or vice versa through lead wire 1 and one of the synchronizing contacts of the camera is connected to the flash device through lead wire 2 while lead wire 3 is used as the common return.

The present invention utilizes only a pair of connecting wires for flash synchronization as well as automatic exposure control.

Figure 2:
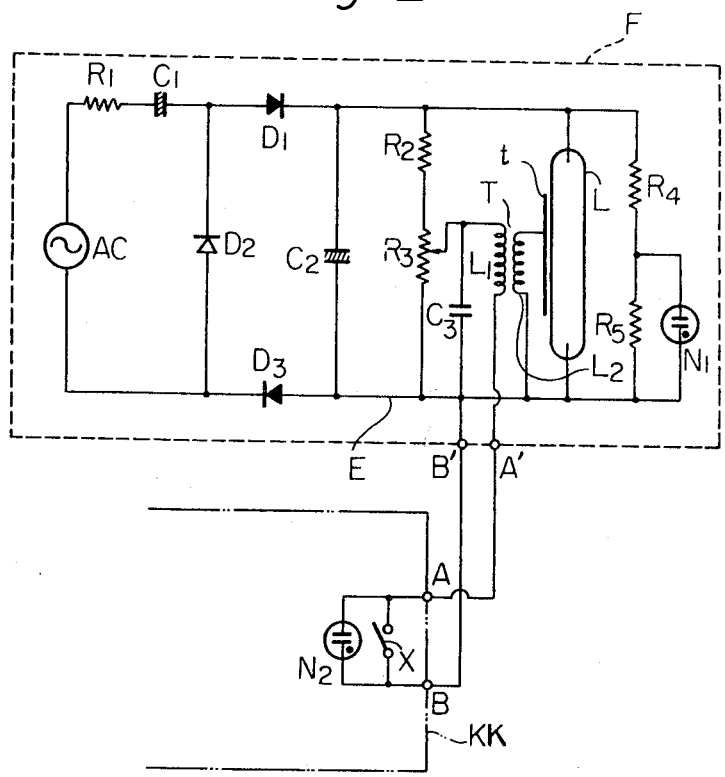
FIG. 2 shows the electric circuit of the device of the present invention for indicating charging of the main capacitor of an electronic flash device.

Referring to FIG. 2, a stroboscopic electronic flash device F is connected by a pair of lead wires to a camera K. The flash device F employs an AC source and has a multiplying rectifying circuit consisting of resistor $R_1$ capacitor $C_1$, main capacitor $C_2$, and diodes $D_1$, $D_2$ which are connected to the terminals of AC source. Electronic discharge flash tube L is connected in parallel to main capacitor $C_2$.

A voltage divider consisting of resistors $R_4$ and $R_5$ is connected in parallel to main capacitor $C_2$, and a neon lamp $N_1$ is connected in parallel to resistor $R_5$ so as to be energized when main capacitor $C_2$ is fully charged. The common return or bus line is indicated by E. A resistor $R_2$ and a potentiometer $R_3$ are connected in series across the terminals of main capacitor $C_2$. One terminal of the primary coil $L_1$ of a triggering transformer T is connected to the movable contact of the potentiometer $R_3$ and the other terminal of coil $L_1$ is connected to one of the synchronizing contacts X of camera KK through a terminal A' of the flash device F connected by a lead wire to terminal A of the camera. One terminal of secondary coil $L_2$ of triggering transformer T is connected to triggering electrode $t$ for the flash tube L and the other terminal is connected to bus line E. One terminal of a triggering capacitor $C_3$ is connected to the movable contact of the potentiometer $R_3$ and the other end to bus line E. Bus line E is connected to terminal B' of the flash device F which is connected to terminal B of camera KK by a second lead wire. The other synchronizing contact X is connected to terminal B.

In accordance with the present invention, a tubular neon lamp $N_2$ is connected in parallel to the synchronizing contacts X. Neon lamp $N_2$ is located in the view finder of camera KK so that it can be observed through the finder.

When capacitor $C_2$ is fully charged and neon lamp $N_1$ is energized, electric current flows through resistor $R_2$, potentiometer $R_3$, primary coil $L_1$, and neon lamp $N_2$ in the finder. The potentiometer $R_3$ is adjusted to energize neon lamp $N_2$ simultaneously with neon lamp $N_1$.

When the contacts X are closed while the shutter of camera KK is opened for the exposure, the electric charge of triggering capacitor $C_3$ is supplied to primary coil $L_1$ so that triggering electrode $t$ triggers flash tube L for passing the electric charge of main capacitor $C_2$ to illuminate the object.

Diode $D_3$ is provided in the bus line E for avoiding electric shock when an AC source is used, and can be eliminated when a DC source is used.

Figure 3:
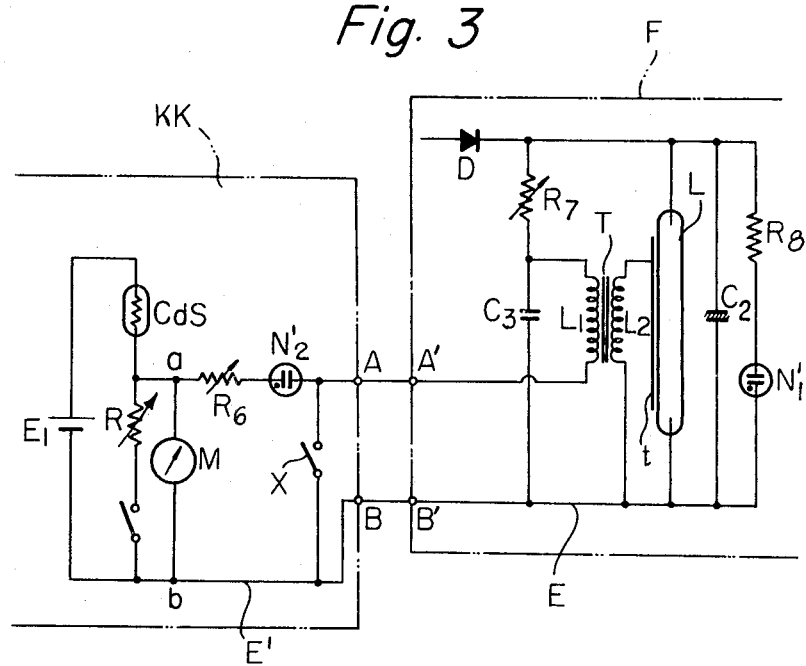
FIG. 3 shows the electric circuit of the device of the present invention for controlling the exposure.

FIG. 3 shows an embodiment of the present invention for controlling exposure in a camera having an automatic diaphragm operating device and a stroboscopic flash device. The automatic diaphragm operating device in camera KK comprises a photoelectric element CdS, a diaphragm operating element M which is an ammeter, and a mercury cell $E_1$ which are connected in series. A resistor R for adjusting the device is accordance with film sensitivity is connected in parallel to element M. One terminal $a$ of element M is connected to camera terminal A through a variable resistor $R_6$ and neon lamp $N_2'$ located in the viewfinder. The resistor $R_6$ is set by focusing the image of an object. The other terminal $b$ of element M is connected to camera terminal B of camera KK through a bus line E'. One of the synchronizing contacts X is connected to terminal A while the other is connected to terminal B. Terminals A, B are connected to terminals A', B' of flash device F, respectively through a pair of lead wires.

The flash device F comprises a source of electric current as in FIG. 2 (not shown), a main capacitor $C_2$, an electric discharge flash tube L, a triggering transformer T connected to a triggering electrode $t$, and a triggering capacitor $C_3$ each connected as shown. In this embodiment, resistor $R_8$ and neon lamp $N_1'$ are connected in a series circuit parallel to main capacitor $C_2$, and a variable resistor $R_7$ is connected between the plus terminal of the current source and the junction of one terminal of capacitor $C_3$ with one terminal of primary coil $L_1$ of triggering transformer T. The other terminal of primary coil $L_1$ is connected to terminal $A'$. The set resistor $R_7$ is variable in accordance with the guide number of the flash device F. The other terminal of capacitor $C_3$ is connected by bus line E to terminal $B'$. Neon lamp $N_1'$, when energized, indicates the complete charging of main capacitor $C_2$.

In operation, main capacitor $C_2$ is charged when camera KK is coupled with flash device F, and, when the charging is completed, neon lamp $N_2'$ is energized by an electric current flowing through variable resistor $R_7$, primary coil $L_1$, terminal $A'$, terminal A, variable resistor $R_6$ and diaphragm operating element M. Therefore, when the variable resistor $R_7$ is set according to the guide number and the variable resistor $R_6$ is set according to the distance set on the camera KK, element M is adjusted for the proper exposure of the camera. When the synchronizing contacts X are closed, the flash tube L is energized by triggering transformer T releasing the electric charge of capacitor $C_3$ and the proper exposure is achieved by element M controlled by variable resistors $R_6$, $R_7$.

The lamp $N_2'$ located in the finder indicates the charging of the main capacitor $C_2$ while the camera KK is coupled with the flash device F by only two lead wires. The operation of the camera is easy and the device is simple in its construction.

Figure 4:
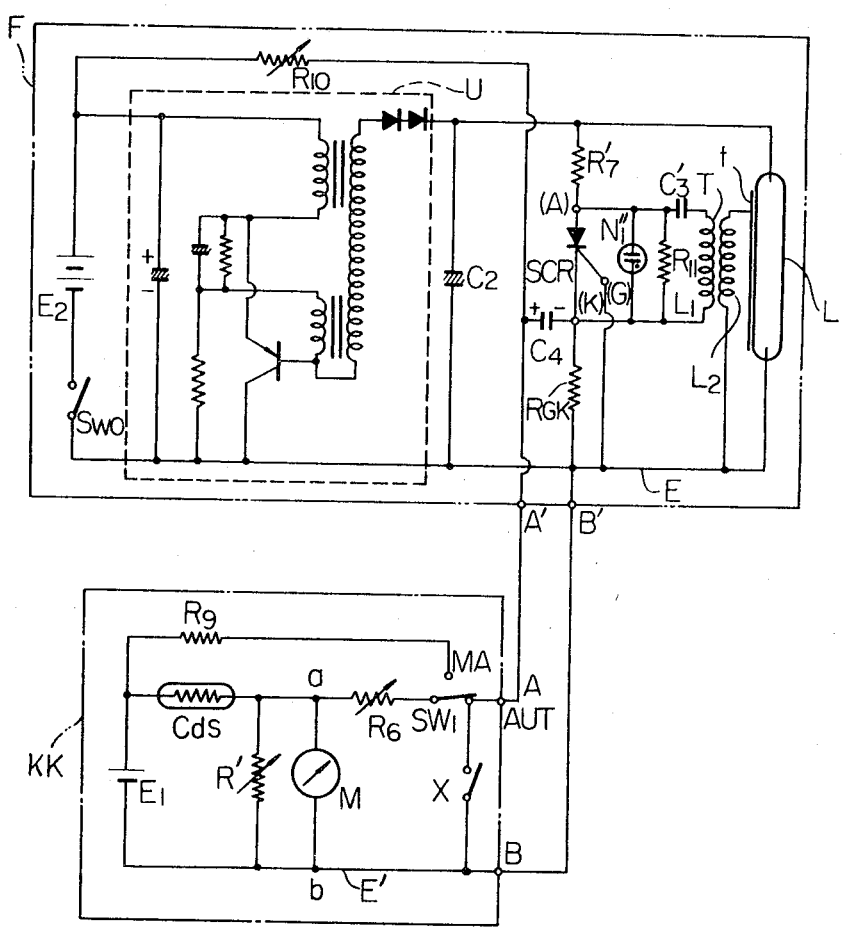
FIG. 4 is a diagram similar to FIG. 3 but showing a modified exposure control.

Referring to FIG. 4 showing another embodiment of the present invention, the automatic diaphragm operating device in camera KK is similar to that shown in FIG. 3, but a variable resistor $R'$ replaces the resistor R for adjusting the device according to the sensitivity of the film used and neon lamp $N_2'$ is replaced by manually operable SPDT switch SW1. Contact AUT of switch SW1 is connected to terminal A while contact MA of switch SW1 is connected to current source $E_1$ through a compensating resistor $R_9$. By switching switch SW1 to contact AUT, the automatic exposure control is operated by the current supplied from the electric source $E_2$ of flash device F while the automatic exposure control is operated by the electric current supplied from electric source $E_1$ when the switch is set on the contact MA.

The flash device F comprises a known voltage multiplying circuit U, a main capacitor $C_2$, and a flash tube L. Main switch $SW_0$ is connected to electric source $E_2$ for closing and opening the electric circuit of flash device F. One terminal of resistor $R_7'$ of high resistance is connected to the plus terminal of voltage multiplying circuit U and the other terminal is connected to anode (A) of thyrister SCR, to one terminal of neon lamp $N_1''$ and to one terminal of primary coil $L_1$ of triggering transformer T through triggering capacitor $C_3'$. One terminal of secondary coil $L_2$ is connected to triggering electrode $t$ for flash tube L while the other terminal is connected to busline E. The other terminal of neon lamp $N_1''$ and the other terminal of primary coil $L_1$ are connected to cathode (K) of thyrister SCR and to busline E through resistor $R_{GK}$. Control electrode (G) of thyrister SCR is directly connected to busline E. Resistor $R_{11}$ is connected in parallel to neon lamp $N_1''$ for forming a voltage divider together with resistors $R_7'$, $R_{GK}$. A variable resistor $R_{10}$ connects the plus terminal of current source $E_2$ to terminal $A'$ of flash device F. The resistor $R_{10}$ is set in accordance with the guide number as the variable resistor $R_7$ in FIG. 3. Cathode (K) is connected to terminal $A'$ through capacitor $C_4$.

Figure 5:
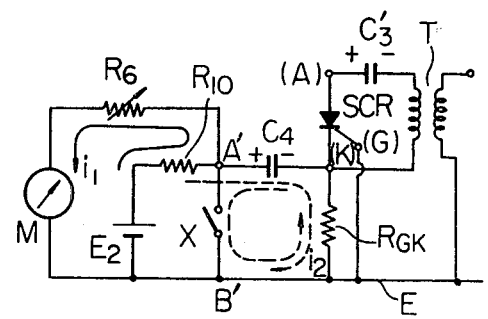
FIG. 5 illustrates the operation of the electric circuit shown in FIG. 4.

The circuit comprising thyrister SCR and capacitor $C_4$ is the basic circuit of the present invention. FIG. 5 illustrates the operation of the electric circuit of FIG. 4. When switch $SW_1$ is switched to contact AUT and switch $SW_0$ is closed, electric current $i_1$ flows from the plus terminal of source $E_2$ to diaphragm operating element M through variable resistor $R_{10}$ variable resistor $R_6$. The capacitor $C_4$ is charged by electric current $i_2$ flowing from source $E_2$ as shown in FIG. 5 by a broken line (clockwise). Neon lamp $N_1''$ is energized when main capacitor $C_2$ is fully charged. When synchronizing contacts X are closed while the shutter of camera KK is opened for the exposure, the electric charge stored in capacitor $C_4$ is discharged as shown by another broken line (counterclockwise) in FIG. 5 so that thyrister SCR is triggered to rendered conductive. The elements in the circuit are chosen so that terminal voltage $vc_4$ satisfies the formula:

$$vc_4 = \frac{r_M + r_6}{r_M + r_{10} + r_6} \cdot E_2[l_2] > v_G$$

where:
$r_M$=internal resistance of element M
$r_6$=resistance of resistor $R_6$
$r_{10}$=resistance of resistor $R_{10}$
$E_2[l_2]$=voltage of source $E_2$
$v_G$=switching voltage of thyrister SCR Thus, the capacity of capacitor $C_4$ is a function of the switching voltage of gate (G) of thyrister SCR.

When thyrister switches to render thyrister SCR to be conductive, the capacitor $C_3'$ is discharged through thyrister SCR so that a high voltage is generated in transformer T so as to trigger the flash tube L through electrode $t$.

Because of the provision of a thyrister in the trigger circuit of the flash device, the flash device and the camera can be connected by only two lead wires, and the diaphragm opening of the camera is controlled by means of the flash device for a achieving the proper exposure.

When the diaphragm operating device is energized the electric current source of the flash device, greater current is available so that the range of adjustment according to the sensitivity of the photographic film can be widened.

Figure 6:
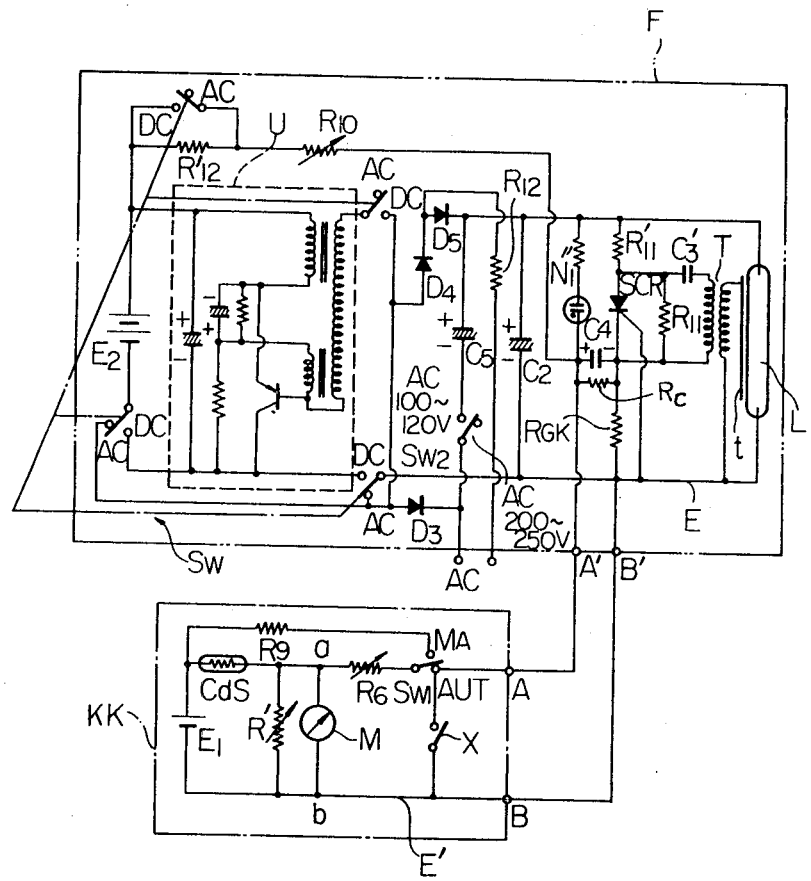
FIG. 6 shows a further embodiment of an exposure control circuit in the manner of FIG. 4.

FIG. 6 shows a modification of the circuit of FIG. 4 in which the electric current for energizing the flash tube can be supplied from an external source of AC, while the electric current for the automatic diaphragm control is supplied from the built-in current source of the flash device, and, when the external source is not available, the electric current for the flash tube is also supplied from the internal source of the flash device.

The electric circuits of camera KK and flash device F shown in FIG. 6 are similar to those shown in FIG. 4 except that neon lamp $N_1''$ is connected to the plus terminal of capacitor $C_2$ through a resistor and to the plus terminal of capacitor $C_4$ while a resistor $R_c$ is connected in parallel to capacitor $C_4$, and that a four-pole—double-throw switch SW is connected to the two output terminals of voltage multiplying circuit U, to the minus input terminal of voltage multiplying circuit U and between the plus terminal of current source $E_2$ and variable resistor $R_{10}$ as shown in FIG. 6. A compensating resistor $R_{12}'$ is connected in parallel to the last-mentioned switch element. When switch SW is switched to AC, the electric current from external source AC is supplied to main capacitor $C_2$ through a voltage multiplying circuit consisting of rectifier $D_4$, $D_5$, capacitor $C_5$, and resistor $R_{12}$ connected as shown in FIG. 6. Compensating resistor $R_{12}'$ controls the electric current supplied to the diaphragm operating device of camera KK when switch SW is switched to AC, because the operating voltage supplied to the flash device is different from the voltage available from voltage multiplying circuit U energized by electric source $E_2$.

100-120 volts or 200-250 volts are usually available from a commercial AC source. In order to permit both voltages to be utilized in the flash device, switch $SW_2$ is connected in series to capacitor $C_5$. Switch $SW_2$ is opened when an external source of 200-250 volts is used so that the input voltage is directly supplied to rectifier $D_5$ to be converted to DC, while, when an external source of 100-120 volts is used, switch $SW_2$ is closed to form a voltage multiplying circuit.

When switch SW is switched to DC, then the circuit of FIG. 6 operates in the same manner as that of FIG. 4.

Figure 7:
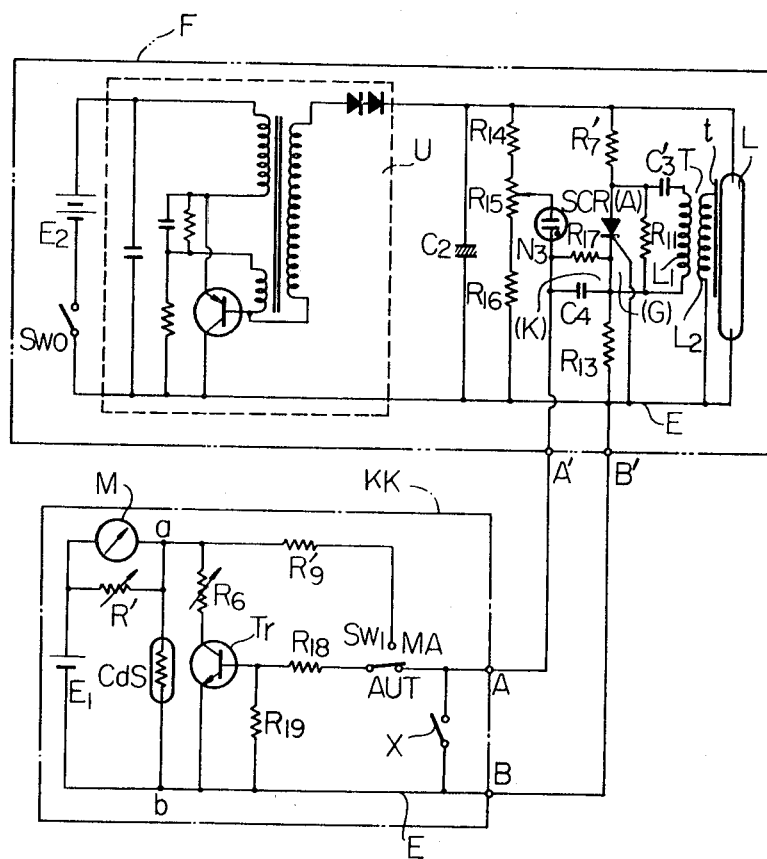
FIG. 7 is a diagram of yet another exposure control circuit.

FIG. 7 shows another modification of the circuit of FIG. 4, in which a transistor is provided in the circuit of the automatic diaphragm operating device so that the current supplied from the flash device is amplified to widen the range of adjustment of the diaphragm operating device of the camera in accordance with the sensitivity of the film in the camera.

In FIG. 7, the circuit of flash device F is similar to that shown in FIG. 4 modified as shown in FIG. 6 except that electric current controlled by variable resistor $R_{15}$ is supplied to camera KK through neon lamp $N_3$ to energize the diaphragm operating device. The electric circuit of the diaphragm operating device is similar to that shown in FIG. 4 except that a circuit consisting of transistor $T_r$, resistors $R_{18}$, $R_{19}$ is added. The collector of transistor $T_r$ is connected to the terminal of variable resistor $R_6$ remote from terminal $a$ while the emitter is connected to terminal $b$. The base of transistor $T_r$ is connected to switch $SW_1$ through resistor $R_{18}$ and resistor $R_{19}$ is connected between the base and to terminal $b$.

Figure 8:
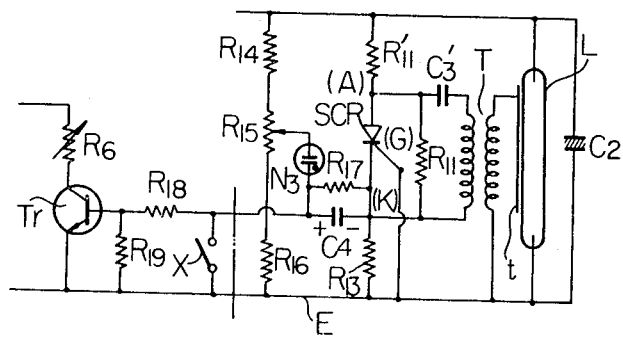
FIG. 8 illustrates the operation of the electric circuit shown in FIG. 7.

The operation of the device of FIG. 7 will be described in connection with FIG. 8. When switch $SW_1$ is switched to AUT and switch $SW_0$ is closed, main capacitor $C_2$ is charged and, at the same time, the capacitor $C_4$ is charged with a voltage $vc_4$ selected to be $$vc_4 \sim \frac{r_{13}}{r_{7'} + r_{11} + r_{13}} \times vc_2 \sim 0.1 \text{ to } 0.3 \text{ volt}$$

where:
- $r_{13}$ = resistance of $R_{13}$
- $r_{7'}$ = resistance of $R_{7'}$
- $r_{11}$ = resistance of $R_{11}$
- $vc_2$ = voltage of main capacitor $C_2$ In this condition, however, thyrister SCR cannot be made conductive even when capacitor $C_4$ is discharged through resistor $R_{13}$ by closing synchronizing contacts X, because a negative voltage is applied between gate (G) and cathode (K) of thyrister SCR, thereby preventing malfunctioning before neon lamp $N_3$ is energized and indicates complete charging of main capacitor $C_2$. When main capacitor $C_2$ has been fully charged, neon lamp $N_3$ is lit and capacitor $C_4$ is charged by the electric current flowing through the lamp so that negative charge appears at the terminal of capacitor $C_4$ connected to cathode (K) and a positive charge appears at the terminal of capacitor $C_4$ connected to lamp $N_3$ and, at the same time, the electric current from lamp $N_3$ is supplied to transistor $T_r$ and amplified thereby. The amplifier current is controlled by resistor $R_6$ as in the aforedescribed embodiments.

When the synchronizing contacts X are closed, capacitor $C_4$ is discharged through resistor $R_{13}$ to switch thyrister SCR so that triggering capacitor $C_3'$ is also discharged through thyrister SCR to trigger flash tube L.

Figure 9:
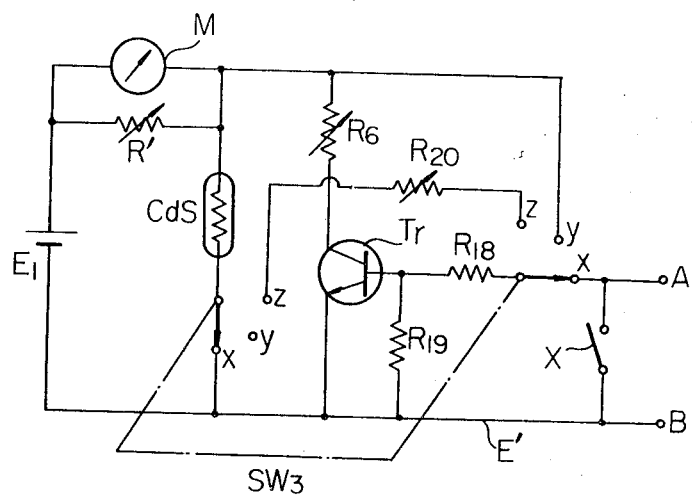
FIG. 9 shows a modification of the circuit of FIG. 7.

FIG. 9 shows a modification of the circuit of FIG. 7 wherein a double-pole—triple-throw switch $SW_3$ is provided in the diaphragm operating device instead of switch $SW_1$ so that the transistor circuit may be utilized as a booster for measuring light of low intensity.

Switch $SW_3$ includes two sets of contacts $x$, $y$, $z$ connected as shown, contacts $x$ being used for the automatic control of the diaphragm operating device by means of the flash device while contacts $y$ are used for the automatic control of the diaphragm opening independently of the flash device. Contacts $z$ are connected through a variable resistor $R_{20}$. When switch $SW_3$ is switched to $z$, the current from photoelectric element $CdS$ is amplified by the transistor circuit and supplied to diaphragm operating element M which also indicates light intensity.

Figure 10:
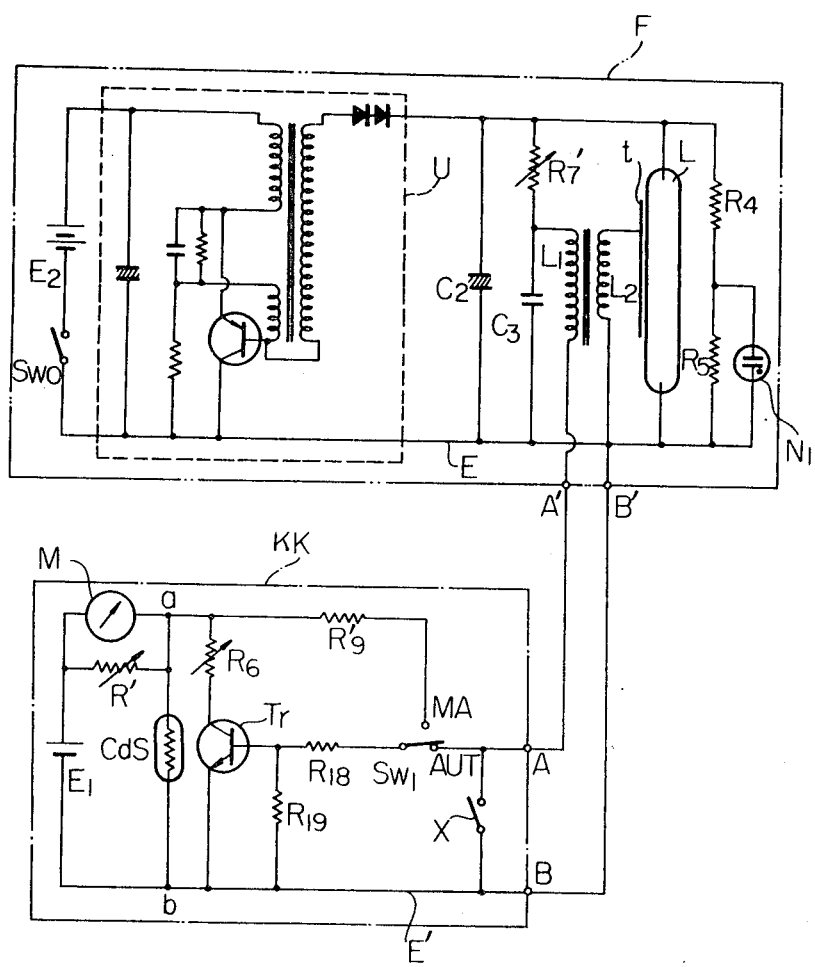
FIG. 10 illustrates a modification of the circuit shown in FIG. 3.
Figure 11:
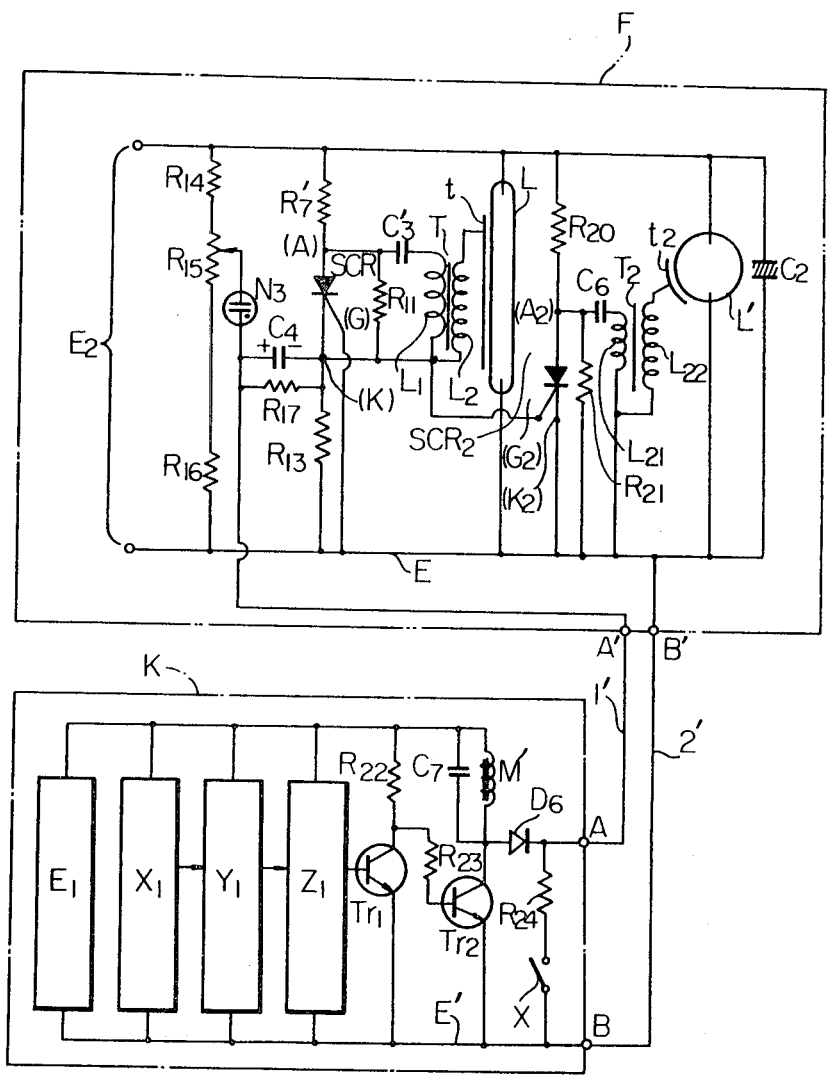

FIG. 10 shows a modification of the circuit of FIG. 3 wherein a transistor circuit is provided in the diaphragm operating device of the camera which is similar to that of FIG. 7. The electric current supplied from primary coil $L_1$ of triggering transformer T is supplied to the transistor circuit to be amplified thereby. The operation is similar to that of FIG. 7.

I claim:

1. An automatic exposure system comprising the combination of a camera and a photoflash unit, said camera comprising, in series, a source of potential; a light-sensitive device; a diaphragm-adjusting mechanism; and a pair of contacts coupled to the shutter of said camera; said photoflash unit comprising a source of potential; a photoflash tube connected to said source; and means for triggering said tube into conduction, said latter means being connected to said camera shutter contacts by at least a pair of conductors, wherein the improvement comprises:

a first variable resistor serially connected to said diaphragm-adjusting mechanism and mechanically connected to, and varied by, the focus ring of said camera; and a second variable resistor connected to said photoflash source of potential and adjusted in accordance with the guide number of said photoflash unit, said first and second resistors forming a series circuit with said diaphragm-adjusting mechanism and said photoflash source, whereby the current passing through said diaphragm-adjusting mechanism, and hence the aperture of said camera, is varied as the focus of said camera is altered and the guide number of said photoflash unit changes, thereby ensuring proper exposure in said camera.

2. The system according to claim 1, wherein said camera further comprises a third variable resistor, connected in parallel with said diaphragm-adjusting mechanism, said resistor being varied in accordance with the speed of the film loaded in said camera so that the current flowing through said mechanism, and hence the aperture of said camera, is compensated for variations in the speed of said film.

3. The system according to claim 1, wherein said photoflash unit includes a first capacitor which is charged by said source of potential to fire said photoflash tube, and said camera further comprises a first neon lamp, physically located so as to be visible in the viewfinder finder of said camera, said neon lamp being connected in the series circuit including said first and second variable resistors and being illuminated when said first capacitor becomes fully charged, thereby indicating to the eye of a user, that said photoflash unit is ready for use.

4. The system according to claim 1, wherein said triggering means comprises a triggering transformer having a secondary winding connected to a triggering electrode on said photoflash tube; and a triggering capacitor chargeable through said second variable resistor, said flash unit further comprising:

a thyristor having its anode-cathode path in parallel with the primary of said triggering transformer and its trigger electrode connected to ground, the cathode of said thyristor being connected to ground via a first fixed resistor, one plate of said triggering capacitor being connected to the juncture of said cathode and said first fixed resistor, whereby, when said shutter contacts are closed, said triggering capacitor discharges through said first fixed resistor, thereby firing said thyristor which, in turn, applies a current pulse to said triggering transformer to thereby initiate conduction in said photoflash tube.

5. The system according to claim 4, wherein said camera further comprises switch means for selectively interrupting the series circuit including the first variable resistor in said camera and the second variable resistor in said photoflash unit, whereby said first variable resistor cooperates with the potential source in said camera, and said light-sensitive device, to control the exposure in said camera independently of said photoflash unit.

6. The system according to claim 4, wherein said photoflash unit includes switching means for energizing said photoflash tube from an external source of AC current, while maintaining the connection of said source of potential as the current supplying source for the series connection of said first and second variable resistors, and said diaphragm, whereby the aperture setting of said camera is rendered immune to variations due to noise and fluctuations in the potential of said external AC source.

7. The system according to claim 4, wherein said photoflash unit includes a neon lamp serially connected between said second variable resistor and one of said pair of conductors interconnecting said photoflash unit and said camera, and said camera further comprises amplifying means, serially connected in the circuit including said first and second variable resistors, for amplifying the current flowing therethrough; whereby the range of adjustment of said diaphragm-adjusting mechanism is extended.

8. The system according to claim 7, wherein said amplifying means comprises a transistor in common emitter configuration, said first variable resistor being serially connected in the collector circuit thereof; and means for biasing said transistor into linear operation.

9. The system according to claim 8, wherein said camera further comprises switching means for interrupting the serial connection of said first and second variable resistors and establishing, in lieu thereof, a connection between said first variable resistor and a first compensating resistor, having one end thereof connected to said diaphragm-adjusting mechanism, whereby the exposure of said camera is automatically controlled independently of said photoflash unit.

10. The system according to claim 9, wherein said switching means is adapted to selectively associate said transistor amplifier with said light-sensitive device whereby the light-sensitive device may be utilized to control the aperture of said camera in light of low intensity.

11. The system according to claim 7, wherein said camera further includes a fourth variable resistor, connected in parallel with said diaphragm-adjusting mechanism, said resistor being varied in accordance with the speed of the film loaded in said camera so that the current flowing through said mechanism, and hence the aperture of said camera, is compensated for variations in the speed of said film, in the extended range made possible by said amplifying means.

* * * * *